US00RE36303E

United States Patent [19]

Ogawa et al.

[11] E Patent Number: Re. 36,303

[45] Reissued Date of Patent: Sep. 14, 1999

[54] INK JET RECORDING SHEET

[75] Inventors: Susumu Ogawa; Hideaki Senoh; Kouji Idei, all of Tokyo, Japan

[73] Assignee: Mitsubishi Paper Mills Limited, Tokyo, Japan

[21] Appl. No.: 08/870,290

[22] Filed: Jun. 6, 1997

Related U.S. Patent Documents

Reissue of:

[64] Patent No.: 5,496,634
Issued: Mar. 5, 1996
Appl. No.: 08/119,399
Filed: Sep. 13, 1993

[30] Foreign Application Priority Data

Dec. 16, 1992 [JP] Japan ..... 4-336136
Mar. 8, 1993 [JP] Japan ..... 5-045596

[51] Int. Cl.[6] ..... B41M 5/00; B05D 5/04

[52] U.S. Cl. ..... 428/341; 428/195; 428/211; 428/342; 428/411.1; 428/500

[58] Field of Search ..... 428/195, 211, 428/341, 342, 411.1, 500

[56] References Cited

U.S. PATENT DOCUMENTS

| | | | |
|---|---|---|---|
| 4,396,670 | 8/1983 | Sinclair | 428/321.5 |
| 4,576,867 | 3/1986 | Miyamoto . | |
| 4,613,525 | 9/1986 | Miyamoto et al. | 428/195 |
| 5,075,153 | 12/1991 | Malhotra | 428/211 |

FOREIGN PATENT DOCUMENTS

| | | |
|---|---|---|
| 0 288 008 | 10/1988 | European Pat. Off. . |
| 60-11389 | 1/1985 | Japan . |
| 60-49990 | 3/1985 | Japan . |
| 62-198493 | 9/1987 | Japan . |
| 63-205276 | 5/1988 | Japan . |

OTHER PUBLICATIONS

Osaka Merchandise Mart—Technical Interchange between Different Industries Jun. 10–12, 1986 w/Pamphlet.

*Primary Examiner*—Pamela R. Schwartz
*Attorney, Agent, or Firm*—Armstrong, Westerman, Hattori, McLeland & Naughton

[57] ABSTRACT

The present invention provides an ink jet recording sheet which includes a support and an ink-receiving layer coated on at least one side of the support wherein the ink-receiving layer contains a coating composition containing a quaternary salt of dimethylamine·epichlorohydrin adduct represented by the following formula (1):

(1)

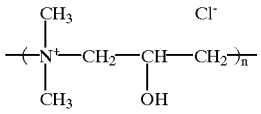

wherein n shows a polymerization degree and is a positive number in the range of 2 to 2000. The ink-receiving layer may additionally contain a (meth)acrylamide-diallylamine copolymer for further effectively inhibiting the color degradation of the image.

4 Claims, No Drawings

INK JET RECORDING SHEET

Matter enclosed in heavy brackets [ ] appears in the original patent but forms no part of this reissue specification; matter printed in italics indicates the additions made by reissue.

BACKGROUND OF THE INVENTION

The present invention relates to an ink jet recording sheet that exhibits good ink fixing performance while spread of ink dots especially under a high humidity circumstance is prevented and further fading or change in color of the recorded images that is apt to occur with lapse of time is inhibited.

The ink jet performs recording of images or letters by depositing ink droplets ejected by various working principles on a recording sheet such as a paper. The ink jet recording has such favorable features that it makes high-speed recording possible, that it produces little noise, that it can easily perform multi-color recording, that there is no limitation as to kind of patterns or images, and that it requires no processing for development and fixing. Thus, the ink jet recording is rapidly becoming widespread in various fields as devices for recording various images including kanjis (Chinese characters) and color images. Furthermore, the images formed by the multi-color ink jet recording method are by no means inferior to those printed by a multi-color press or those obtained by a color-photography. Besides, use of the ink jet recording extends to a field of full-color image recording where number of copies is not so many, since costs per copy are less expensive than those employing the photographic processes.

As for the recording sheets for ink jet recording, efforts have been made from the aspects of printer hardwares or ink compositions in order to make use of woodfree papers or coated papers used for ordinary printing or writing. However, improvements in recording sheets have come to be required increasingly in order to go side by side with developments in printer hardwares such as ever increasing speed, development of ever finer definition image of full color, and also with expanding fields of uses. That is, recording sheets are demanded to develop ever high reproducibility image, and in order to meet that demand image density of the printed dots be maintained high, hue characteristics be bright and appealing, the ink applied be fixed quickly and does not bleed or spread even though a different color ink is put over additionally. Moreover, ink should set quickly, dots should not spread more than needed and the circumference of the dots be sharp and demarcating.

Some proposals have, hitherto, been made for meeting these demands. For example, it is attempted to improve ink absorbing property by providing an ink-receiving layer mainly composed of a silica pigment thereby letting it serve an absorbing layer on the surface of a support [Japanese Patent Kokai (Laid-Open) Nos. 52-9074 and 58-72495]. In order to improve the ink absorbing property of this ink-receiving layer and to obtain a high image density of printed dots while keeping their spread in restraint, Japanese Patent Kokai (Laid-Open) Nos. 55-51583 and 56-157 propose to add non-colloidal silica powders to the ink-receiving layer. A further attempt looks at the dye distribution state in the ink-receiving layer as a factor influencing tinctorial characteristics and sharpness, and proposes to use a specific dye-absorbing agent which adsorbs the dye component in the ink [Japanese Patent Kokai (Laid-Open) No. 55-144172].

The above proposals are successful in keeping dots spread in restraint and in developing images excellent in sharpness and color quality, but only under relatively favorable environment. Those successful effects can hardly be maintained always when the recording and storing environment changes. Especially, when recording is carried out or the printed record is stored under a high humidity condition, the ink that is usually aqueous and has set once becomes liquid by absorbing moisture and comes to bleed. Another problem is that the colorant changes with time to cause discoloration of the recorded image. The aforesaid bleeding of ink leads to enlargement of dots diameter bringing about degradation in sharpness, color quality, and image reproducibility. In addition, discoloration of the recorded image results in not only the degradation of color quality, but also the problem of forming images of utterly different color.

If these problems happen, value as an ink jet recording sheet is impaired, and the following measures can be considered for avoiding the problems. For developing sharpness of the image, it is preferred that horizontal spread of an ink dot is restrained; for maintaining the color quality of the images, it is preferred that the colorant of the ink remains on the surface of the recording sheet. Thus, it is ideal that only the vehicle of the ink permeates into inside of the recording sheet leaving colorant at its surface. On the other hand, for avoiding discoloration with lapse of time, the colorant preferably penetrates with the vehicle into a depth from the surface of the recording sheet so that it may be protected against external factors like light or ozone gas. Thus, the restraint of dots spread and prevention of color quality degradation are conflicting with each other and it is difficult to solve both of them simultaneously.

With the recent proliferation of ink jet printers, the environment in which printing is carried out by ink jet recording is diversified considerably, and such image reproducibility as not affected by environment is demanded. Furthermore, in the field of full-color hard copy in which the ink jet recording method has now come to be employed increasingly, storage stability is demanded ever eagerly. Thus, ink jet recording sheets satisfying these demands are needed.

SUMMARY OF THE INVENTION

The object of the present invention is to provide an ink jet recording sheet that exhibits good ink fixing performance while spread of ink dots, especially under a high humidity circumstance, is inhibited, and further fading or change in color of the recorded images that apt to occur with lapse of time is inhibited as well.

As a result of extensive research conducted by the inventors on ink jet recording sheets, it has been found that fixing performance can be improved, ink dot spread can be inhibited even under a high humidity environment, and furthermore color quality degradation can be controlled by providing an ink-receiving layer of the recording sheet formed a coating composition containing a specific agent.

That is, the present invention provides an ink jet recording sheet comprising a support and at least one ink-receiving layer coated on a side of the support, characterized in that said ink-receiving layer comprises a coating composition containing a quaternary salt of dimethylamine·epichlorohydrin adduct represented by the following formula (1):

(1)

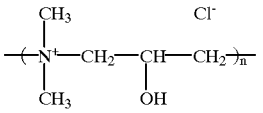

wherein n is a positive number which shows the polymerization degree and is in the range of 2 to 2000.

DESCRIPTION OF THE INVENTION

The quaternary salt of dimethylamine·epichlorohydrin adduct used in the present invention is a quaternary ammonium salt having cationic property. The polymerization degree n and the amount of the quaternary salt have a close relation to the viscosity of the coating composition of the ink-receiving layer and can be optionally determined in view of the viscosity that does not adversely affect the production steps, e.g. preparation of the coating composition and application of that composition in terms of its coating weight controllability. However, the polymerization degree n is preferably 2000 or less from the view point of handling, and its amount is desirably regulated to bring the PD that is defined by the following equation within the range of 0.2 to 40 meq/m$^2$, preferably 0.7 to 20 meq/m$^2$;

$$PD=ED\times WD$$

where, ED: [meq/g]—cationic charge amount as represented by colloidal titration amount of the cationic quaternary salt;

WD [g/m$^2$]: amount of that quaternary salt WD [g/m$^2$] contained in the ink-receiving layer; and PD: [meq/m$^2$] cationic charge amount as represented by colloidal titration amount per unit area of the recording sheet.

Magnitude of the PD varies depending on the levels required for attaining the object, but if it is less than 0.2 meq/m$^2$, it is difficult to ensure the ink fixing performance and it further becomes difficult to inhibit the degradation in color quality. If the magnitude exceeds 40 meq/m$^2$, ink absorption rate—i.e. the rate of permeation of the ink vehicle through the ink-receiving layer, is low, so that the ink tends to spread on the surface of the ink-receiving layer effecting enlargement of the dot diameter, thereby reducing reducing sharpness of the printed image. Furthermore, in order to obtain a given level of ink fixing performance, amount of the quaternary salt must be increased with decrease in the polymerization degree n. The polymerization degree n of the quaternary salt is preferably in the range of 300 to 2000.

The coating composition for the ink-receiving layer may additionally contain (meth)acrylamide-diallylamine copolymer which is a cationic secondary amine and is high in function to inhibit degradation in color quality. Use of the copolymer also helps obtain ink fixing performance under a normal environment, but does not under a high humidity environment, so that the object of the present invention cannot be attained by the addition of the copolymer alone. When it is used with the above-mentioned quaternary salt of dimethylamine·epichlorohydrin adduct in combination, both of the favorable effects are attained without fail.

In the present invention, the above-mentioned quaternary salt of dimethylamine·epichlorohydrin adduct may be used alone, but in order to sufficiently obtain the respective merits of the quaternary salt and the copolymer, it is preferred to use both of them in combination. Amount of the copolymer in the ink-receiving layer is preferably in the range of ¼ to 2/1 in weight ratio to the quaternary salt and the total amount thereof is preferably regulated to bring the colloidal titration amount P [meq/m$^2$] calculated by the following formula within the range of 0.2 to 40 meq/m$^2$, preferably 0.7 to 20 meq/m$^2$;

$$P=E_D\times W_D+E_A\times W_A$$

where, $E_D$ and $E_A$: colloidal titration amount, [meq/g], of cation of the quaternary salt and the copolymer respectively;

$W_D$ and $W_A$: coating weight (g/m$^2$) of the quaternary salt and the copolymer respectively.

Supports used in the present invention include base papers prepared by mixing a wood pulp, for example, a chemical pulp such as LBKP or NBKP, a mechanical pulp such as GP, PGW, RMP, TMP, CTMP, CMP or CGP or recycled fibers such as DIP and pigment known in the art as main components with at least one of the additives such as binder, sizing agent, fixing agent, retention aid, cationizing agent and strengthening agent and making papers from the resulting mixture by a paper former such as Foudrinier machine, cylinder machine and twin wire machine. The supports may further include any sheet integrities such as base papers applied with starch, polyvinyl alcohol or the like as an anchor coat layer using a size press, or coated papers applied with a pigment layer such as art papers, cast coated papers or the like. In addition, the supports may be one having a polyolefin resin layer, synthetic resin films such as polyethylene, polypropylene, polyester, nylon, rayon and polyurethane and mixtures thereof, or those formed of synthetic fibers of those resins. For improving surface smoothness, these supports may be processed prior to being applied with the ink-receiving layer by a machine calender, TG calender, soft calender and the like.

The ink-receiving layer is mainly composed of a pigment and a binder to which the quaternary salt of dimethylamine·epichlorohydrin adduct is added as an essential component. Embodiments of the present invention include a paper having an ink-receiving layer in which the quaternary salt of dimethylamine·epichlorohydrin adduct is contained. A specific embodiment of the present invention is directed to papers having a backcoat layer provided on the side opposite to the side the ink-receiving layer is coated.

The base paper, the ink-receiving layer and the backcoat layer of the present invention may contain a kind or more of white pigments known in the art. Examples of the white pigment are inorganic white pigments such as precipitated calcium carbonate, ground calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo boehmite, aluminum hydroxide, alumina, lithopone, zeolite, hydrolyzed halloycite, magnesium carbonate and magnesium hydroxide and organic pigments such as styrene plastics pigment, acrylic plastics pigment, polyethylene, microcapsules, urea resin and melamine resin.

Binders contained in the ink-receiving layer and the backcoat layer include polyvinyl alcohol, vinyl acetate, oxidized starch, etherified starch, cellulose derivatives such as carboxymethyl cellulose and carboxyethyl cellulose, casein, gelatin, soybean protein, silyl-modified polyvinyl alcohol; conjugated diene copolymer latexes such as maleic anhydride resin, styrene-butadiene copolymer and methyl methacrylate-butadiene copolymer; acrylic polymer latexes such as polymers or copolymers of acrylic esters and methacrylic esters and polymers or copolymers of acrylic acid and methacrylic acid; vinyl polymer latexes such as ethylene-vinyl acetate copolymer; functional group-modified polymer latexes obtained by modifying the above-mentioned various polymers with monomers containing functional group such as carboxyl group; aqueous adhesives such as thermosetting synthetic resins, for example, melamine resin and urea resin; synthetic resin adhesives such as polymethyl methacrylate, polyurethane resin, unsaturated polyester resin, vinyl chloride-vinyl acetate copolymer, polyvinyl butyral and alkyd resin. These may be used alone or in combination of two or more.

In a specific embodiment of the present invention where a kind or more of the above-mentioned pigments are used as a main component, use of a porous inorganic pigment is preferred. Examples of such porous inorganic pigment are porous synthetic amorphous silica, porous magnesium carbonate and porous alumina, and porous synthetic amorphous silica having a large pore volume is especially preferred.

The total amount of the binders can be optionally adjusted depending on the characteristics of the desired ink jet recording sheet, but generally it is 5 to 60% by weight base on 100% by weight of the pigment.

The ink-receiving layer composition may further and optionally contain, as other additives, pigment dispersing agent, thickening agent, fluidity improver, defoamer, foam inhibitor, releasing agent, foaming agent, penetrant, dye, color pigment, fluorescent brightener, ultraviolet absorber, antioxidant, preservatives, slimecide, water proofing agent, wet strengthening agent and dry strengthening agent.

The backcoat layer composition can contain, as other additives, pigment dispersing agent, thickening agent, fluidity improver, defoamer, foam inhibitor, release agent, foaming agent, penetrant, dye, color pigment, fluorescent brightener, ultraviolet absorber, antioxidant, preservatives, slimecide, water proofing agent, wet strengthening agent and dry strengthening agent.

For applying the ink-receiving layer and backcoat layer by coating or impregnation, there may be used a variety of applicators known in the art such as blade coater, roll coater, air knife coater, bar coater, rod blade coater, curtain coater, short dowel coater and size press on-machine or off-machine. After completion of the coating or impregnation, the layer is dried and may further be surface-finished using calenders such as machine calender, TG calender, super calender and soft calender.

The aqueous ink referred to in the present invention is a recording solution comprising colorant, solvent and other additives. The colorants include water-soluble dyes such as direct dyes, acid dyes, basic dyes, reactive dyes and food dyes. The solvents for the aqueous ink include water and a variety of water-soluble organic solvents, for example, alkyl alcohols of 1 to 4 carbon atoms such as methyl alcohol, ethyl alcohol, n-propyl alcohol, isopropyl alcohol, n-butyl alcohol, sec-butyl alcohol, tert-butyl alcohol and isobutyl alcohol; amides such as dimethylformamide and dimethylacetamide; ketones or ketone alcohols such as acetone and diacetone alcohol; ethers such as tetra-hydrofuran and dioxane; polyalkylene glycols such as polyethylene glycol and polypropylene glycol; alkylene glycols having 2 to 6 alkylene groups such as ethylene glycol, propylene glycol, butylene glycol, triethylene glycol, 1,2,6-hexanetriol, thiodiglycol, hexylene glycol and diethylene glycol; and lower alkyl ethers of polyhydric alcohols such as glycerin, ethylene glycol methyl ether, diethylene glycol methyl (or ethyl) ether and triethylene glycol monomethyl ether. Of these many water-soluble organic solvents, preferred are polyhydric alcohols such as diethylene glycol and lower alkyl ethers of polyhydric alcohols such as triethylene glycol monomethyl ether and triethylene glycol monoethyl ether. As other additives, mention may be made of, for example, pH regulators, cheleting agents, preservatives, viscosity modifiers, surfactants, wetting agents, agents and anticorrosive agent.

The ink jet recording sheet of the present invention can be used not only as an ink jet recording sheet, but also as any recording sheet on which a liquid ink, or an ink which is liquid at the time of recording, is put for recording. These recording sheets used other than ordinary ink jet recording system include an image-receiving sheet for heat transfer recording system which comprises heating an ink sheet comprising a thin support such as a resin film, a high-density paper or a synthetic paper coated with a heat-meltable ink mainly composed of a heat-meltable substance and a dye or pigment from the back side to melt the ink and transferring the molten ink; a sheet for a specific ink jet recording which makes use of a heated and molten ink or an oleophilic ink solution in which an oil-soluble dye is dissolved in an organic; and an image-receiving sheet on which images are transferred from a photosensitive and pressure-sensitive donor sheet coated with microcapsules containing a photopolymerizable monomer and colorless or colored dye or pigment.

These recording systems are common in that the ink is in a liquid state at the time of recording. A liquid ink permeates or diffuses vertically and horizontally through the ink-receiving layer until it loses fluidity and becomes fixed. Ink absorbing ability of the recording sheet in conformity with the respective recording system is required, so that the ink jet recording sheet of the present invention can be utilized successfully in these recording systems.

Furthermore, the ink jet recording sheet of the present invention can be used as the recording sheets for electrophotographic recording system which is widely used in copiers, printers and the like, where a toner is fixed by heating.

Spread of ink dot is a phenomenon of the ink to diffuse horizontally on the surface of the recording sheet, and in order to inhibit the spread of dot its diffusion along Z-direction needs to be assisted. Provision of an ink-receiving layer having a large surface area helps such diffusion along Z-direction and the spread of ink dot can be inhibited. On the other hand, colorant of the ink also penetrates or sink through a depth of the recording sheet resulting in decrease in image density, which in turn degrades color quality. Since the colorant dissolved in the ink vehicle is anionic, use of an agent having a cationic group in the ink-receiving layer will help fix the colorant on the surface improving image density, but blocks diffusion of the ink along Z-direction to promote the spread of ink dot.

While the spread of ink dot and the image density are the properties that conflict with each other, image density certainly means reflectance of visible light and the reflectance takes place not only at the surface of the ink-receiving layer but also at a distance inward from the surface. This suggests that colorant of the ink may penetrate the layer surface and stay at a distance inward from the surface without influencing on image density. Namely, both of said conflicting properties can be improved if the ink-receiving layer permits passage of the ink at the surface but captures colorant of the ink within the layer.

There are thought to be two options to develop both of the said conflicting properties. One is to raise surface area of the ink-receiving layer and the other to use a compound having a cationic group in the layer. In view of inhibiting bleed of ink under a high humidity environment that is the purpose of the present invention, the latter option is favored. Effects of the former option are rendered by physical absorption, whereas same of the latter option by electrophilic or chemical bonding so that bleeding of the colorant by moisture is much less likely.

The said latter option also favors in achieving inhibition of color quality degradation upon lapse of time, that is the another purpose of the present invention. Change of color, or fading, is thought to be attributable to a change in spectral absorption wave-length of a chromophore or an auxochrome contained in the colorant induced by receiving a certain influence of the environment. The quaternary salt of dimethylamine·epichlorohydrin adduct contained in the ink-receiving layer of the present invention effectively blocks that change. While the theory of that blocking mechanism has yet to be clarified, it is considered that absorption spectrum of the chromophore or auxochrome is stabilized by bonding of the quaternary salt to the colorant, or the quaternary salt has a film-formability and the resultant film covers the colorant to protect it against the outer influence by light or ozone gas. Moreover, inhibition of the color degradation can be further ensured by using (meth)acrylamide-diallylamine copolymer in combination with the quaternary salt.

The following examples are set forth for purposes of illustration of the invention and should not be construed as limiting the invention in any manner. All parts and % are by weight unless otherwise notified.

EXAMPLE 1

A paper stock containing 25 parts of pigments comprising precipitated calcium carbonate/ground calcium carbonate/talc (30/35/35), 0.10 part of commercially available alkyl ketene dimer, 0.03 part of commercially available cationic (meth)acrylamide, 0.8 part of commercially available cationized starch and 0.4 part of aluminum sulfate based on 100 parts by weight of a fiber furnish pulp comprising 80 parts of LBKP (freeness: 400 ml CSF) and 20 parts of NBKP (freeness: 450 ml CSF) was prepared. Using the thus prepared paper stock, a paper sheet to be used for support having a basis weight of 90 g/m$^2$ were formed by a Fourdrinier machine.

An ink-receiving layer was provided on the surface of the thus obtained support. A coating composition for ink-receiving layer was prepared using 100 parts of a synthetic amorphous silica (FINESIL X37B manufactured by Tokuyama Soda Co., Ltd.), 50 parts of polyvinyl alcohol (PVA 117 manufactured by Kuraray Co., Ltd.) and 10 parts of a cationic fixer (ACCURAC 41 manufactured by Mitsui Cyanamid Co., Ltd.; average polymerization degree n=363) whose cationic charge as colloidal titration amount is 6.9 meq/g. The solid concentration of the coating composition was adjusted to 13%. The resulting coating composition for ink-receiving layer was coated at a coating amount of 6 g/m$^2$ on the surface of the above-prepared support by an air knife coater and dried. The resulting sheet was then subjected to calendering to obtain an ink jet recording sheet of Example 1.

EXAMPLE 2

A support was produced in the same manner as in Example 1. A coating composition for ink-receiving layer was prepared in the same manner as in Example 1 except that the cationic fixer was used in an amount of 20 parts. The resulting coating composition was coated on the support and dried and subjected to calendering under the same conditions as in Example 1 to obtain an ink jet recording sheet of Example 2.

EXAMPLE 3

A support was produced in the same manner as in Example 1. A coating composition for ink-receiving layer was prepared in the same manner as in Example 1 except that the cationic fixer was used in an amount of 50 parts. The resulting coating composition was coated on the support and dried and subjected to calendering under the same conditions as in Example 1 to obtain an ink jet recording sheet of Example 3.

EXAMPLE 4

A support was produced in the same manner as in Example 1. A coating composition for ink-receiving layer was prepared in the same manner as in Example 1 except that the cationic fixer was used in an amount of 20 parts and 20 parts of a (meth)acrylamide-diallylamine copolymer of 3.7 meq/g in colloidal titration amount of cation was additionally used. The resulting coating composition was coated on the support and dried and subjected to calendering under the same conditions as in Example 1 to obtain an ink jet recording sheet of Example 4.

COMPARATIVE EXAMPLE 1

A support was produced in the same manner as in Example 1. A coating composition for ink-receiving layer was prepared in the same manner as in Example 1 except that the cationic fixer was not used. The resulting coating composition was coated on the support and dried and subjected to calendering under the same conditions as in Example 1 to obtain an ink jet recording sheet of Comparative Example 1.

COMPARATIVE EXAMPLE 2

A support was produced in the same manner as in Example 1. A coating composition for ink-receiving layer was prepared in the same manner as in Comparative Example 1. The resulting coating composition was coated on the support and dried and subjected to calendering under the same conditions as in Example 1 except that the coating amount was 10 g/m$^2$. Thus, an ink jet recording sheet of Comparative Example 2 was obtained.

Evaluation of the ink jet recording sheets obtained in Examples 1–4 and Comparative Examples 1 and 2 was conducted by measuring the dot spreading rate and the color degradation rate of the image in accordance with the following methods. The results are shown in Table 1. The dot spreading rate shows spread of the dot in a high humidity condition and the larger value means the greater rate influenced by moisture, resulting in impaired sharpness and color quality of the image. The color degradation rate of the image shows the degree of change in color of the image right after recording and after lapse of time. The larger value indicates the more intense color degradation of the image.

<Dot spread rate>

The sample is allowed to stand in an atmosphere of 20° C. and 65% RH for 24 hours for conditioning and then ink dots are printed thereon by an ink jet printer (IO-720 manufactured by Sharp Corporation) using a black ink. The diameter of the dot as a circle defined by the following formula is measured by an image analyzer. Thereafter, the printed sample is left to stand in a moist atmosphere of 40° C. and 90% RH for 24 hours and then the diameter of the dot as a circle is again calculated as aforesaid. The ratio $D_2/D_1$ of the diameters ($D_1$ and $D_2$) of the dot as a circle before and after undergoing the said moist atmosphere is defined to be the dot spread rate.

$$Di=\{(4/\pi)\times A\}^{1/2}$$

In the above formula, Di is a diameter of the dot as a circle and D1 (i=1) is a diameter of the dot as a circle of the sample before undergoing said moist atmosphere and D2 (i=2) is a diameter of the dot as a circle of the sample after undergoing that the atmosphere.

<Color degradation>

A solid pattern was printed on the sample recording sheet by an ink jet printer (IO-720 manufactured by Sharp Corporation) using a black ink and placed in a xenon fadeometer for being subjected to a xenon lamp light 20 hours. Color difference of the sample before and after the exposure to light is measured. The color difference can be defined by the following formula on the basis of the results of measuring the color of the sample before and after the exposure to light in accordance with L*a*b* colorimetric system (CIE 1976). The larger the color difference value indicates more intense color degradation. The measurement is conducted by a color difference meter CR100 manufactured by Minolta Camera Co., Ltd. using light C as standard light source. When the color difference is less than 1.0, the difference in color can hardly be distinguished visually.

$$\Delta E=\{(\Delta L^*)^2+(\Delta a^*)^2+(\Delta b^*)^2\}^{1/2}$$

In the above formula, ΔE denotes color difference and ΔL* and Δa* and Δb* denote the differences of L* and a* and b* before and after the exposure to light, respectively.

TABLE 1

| | Example | | | | Comparative Example | |
|---|---|---|---|---|---|---|
| | 1 | 2 | 3 | 4 | 1 | 2 |
| Diameter as a circle μm | | | | | | |
| $D_1$(20° C. 65% RH) | 360 | 342 | 303 | 326 | 450 | 410 |
| $D_2$(40° C. 90% RH) | 367 | 350 | 308 | 332 | 530 | 472 |
| Dot spreading rate $D_2/D_1$ | 1.02 | 1.02 | 1.02 | 1.02 | 1.17 | 1.15 |
| Color deterioration rate of image ΔE | 0.76 | 0.52 | 0.31 | 0.15 | 1.51 | 1.36 |

COMPARATIVE EXAMPLE 3 AND EXAMPLES 5–9

Supports were produced in the same manner as in Example 1 using a Fourdrinier paper machine. Then, the supports were coated by impregnation with the following size press coating compositions by an on-machine type size press at a coating amount of 4 g/m$^2$ in dry solid content and then dried and calendered to obtain ink jet recording sheets of Comparative Example 3 and Examples 5–9.

(Size press coating composition)

COMPARATIVE EXAMPLE 3

A starch solution of 6% in solid concentration.

EXAMPLE 5

A mixed solution comprising 50 parts of a starch solution of 6% in solid concentration and 50 parts of a solution (6% in solid concentration) of a cationic fixer (represented by the formula (1) where the average polymerization degree n=2 to 3) having a colloidal titration amount of cation of 6.9 meq/g.

EXAMPLE 6

The same mixed solution as of Example 5 except that the cationic fixer had an average polymerization degree n=25.

EXAMPLE 7

The same mixed solution as of Example 5 except that the cationic fixer had an average polymerization degree n=360.

EXAMPLE 8

The same mixed solution as of Example 5 except that the cationic fixer had an average polymerization degree n=545.

EXAMPLE 9

The same mixed solution as of Example 5 except that the cationic fixer had an average polymerization degree n=1820.

Evaluation of the ink jet recording sheets of Comparative Example 3 and Examples 5–9 was conducted by measuring the dot enlarging rate and the results are shown in Table 2.

TABLE 2

| | Comparative Example | Example | | | | |
|---|---|---|---|---|---|---|
| | 3 | 5 | 6 | 7 | 8 | 9 |
| Diameter as a circle μm | | | | | | |
| $D_1$(20° C. 65% RH) | 480 | 372 | 380 | 387 | 391 | 420 |
| $D_2$(40° C. 90% RH) | 635 | 391 | 388 | 390 | 395 | 421 |
| Dot spreading rate $D_2/D_1$ | 1.32 | 1.05 | 1.02 | 1.01 | 1.01 | 1.00 |

As can be seen from Tables 1 and 2, spread of ink dots caused by moisture in a high humidity condition was inhibited in the ink-receiving layer containing the quaternary salt of dimethylamine-epichlorohydrin adduct according to the present invention. Furthermore, it can be seen that the color degradation of image was further inhibited in Example 4 where (meth)acrylamide-diallylamine copolymer was additionally used. It can be further seen that spread of the dot was considerable and color degradation of the image was also considerable in the recording sheets of Comparative Examples 1 and 2 which did not contain the quaternary salt of dimethylamine·epichlorohydrin adduct, and in Comparative Example 2 where the coating amount of the ink-receiving layer was increased inhibition of the ink dots spread and the color degradation of image was appreciable, but the degree of inhibition was less as compared with same in Examples 1–4. Furthermore, Comparative Example 3 and Examples 5–9 show that the dot spreading rate in a high humidity condition was extremely small in the ink jet recording sheets containing the quaternary salt of dimehtylamine·epichlorohydrin adduct according to the present invention.

As is clear from the above explanation, there can be obtained ink jet recording sheets according to the present invention in which good ink fixing performance is ensured and which are inhibited from ink dot spread in a high humidity condition and from color degradation with lapse of time of the image.

What is claimed is:

1. An ink jet recording sheet which comprises a support *of a paper prepared by mixing a wood pulp* and at least one ink-receiving layer coated on one side of the support wherein said ink-receiving layer comprises a coating composition containing [a pigment,] a binder, *a* (*meth*) *acrylamide-diallylamine copolymer* and a quaternary salt of dimethylamine·epichlorohydrin adduct represented by the following formula (1):

(1)

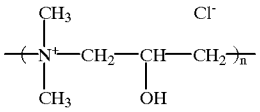

wherein n indicates the degree of polymerization and is a positive number in the range of 2 to 2000.

[2. An ink jet recording sheet according to claim 1, wherein the coating composition of the ink-receiving layer additionally contains a (meth)acrylamide-diallylamine copolymer.]

3. An ink jet recording sheet according to claim 2, wherein the weight ratio of the quaternary salt/the copolymer is ¼ to 2/1.

4. An ink jet recording sheet according to claim 1, wherein the support is a paper or a coated paper.

*5. An ink jet recording sheet according to claim 1, wherein the coating composition of the ink-receiving layer additionally contains a pigment.*

* * * * *